United States Patent

Kata

[11] Patent Number: 5,866,171
[45] Date of Patent: Feb. 2, 1999

[54] MOLD FOR TIRE VULCANIZATION AND MANUFACTURING METHOD THEREOF

[75] Inventor: Takehiro Kata, Tokyo, Japan

[73] Assignee: Bridgestone Corporation, Tokyo, Japan

[21] Appl. No.: 891,195

[22] Filed: Jul. 10, 1997

[30] Foreign Application Priority Data

Jul. 10, 1996 [JP] Japan .................................. 8-198503

[51] Int. Cl.$^6$ .................................................. B29C 33/10
[52] U.S. Cl. ........................ 425/46; 249/141; 425/28.1; 425/812
[58] Field of Search ........................ 249/141; 425/28.1, 425/35, 46, 812

[56] References Cited

U.S. PATENT DOCUMENTS

| | | | |
|---|---|---|---|
| 3,692,090 | 9/1972 | Brobeck et al. | 425/46 |
| 5,204,036 | 4/1993 | MacMillan et al. | 425/46 |
| 5,234,326 | 8/1993 | Galli et al. | 425/46 |
| 5,290,163 | 3/1994 | Katsumata et al. | 425/47 |
| 5,340,294 | 8/1994 | Kata | 425/46 |
| 5,382,402 | 1/1995 | Espie et al. | 264/326 |

FOREIGN PATENT DOCUMENTS 0 707 934   4/1996   European Pat. Off. .
1965121     7/1971   Germany .
61-252109   11/1986  Japan .

*Primary Examiner*—James P. Mackey
*Attorney, Agent, or Firm*—Sughrue, Mion, Zinn, Macpeak & Seas, PLLC

[57] ABSTRACT

A mold for tire vulcanization comprises a plurality of segments forming respectively a part of a circular interior complementary to land portions and groove portions of the tread portion of a tire product and being separable from each other in the tire circumferential direction, and each of the segments comprising a plurality of pieces forming said circular interior part and a block supporting the pieces, wherein each of the pieces comprises a combination of a matrix metal and a core made of a different kind of material which is preferably fitted to a through hole of the matrix metal and has a lower coefficient of thermal expansion than that of the matrix metal. In a method of manufacturing the mold, upon casting the matrix metal, the matrix metal is cast around the core with a higher fusion point than that of the matrix metal. The invention provides a mold for tire vulcanization by which a tire having excellent appearance can be obtained and production of defective tires upon vulcanization can be decreased, and a manufacturing method thereof, without increase of cost.

6 Claims, 2 Drawing Sheets

FIG. I
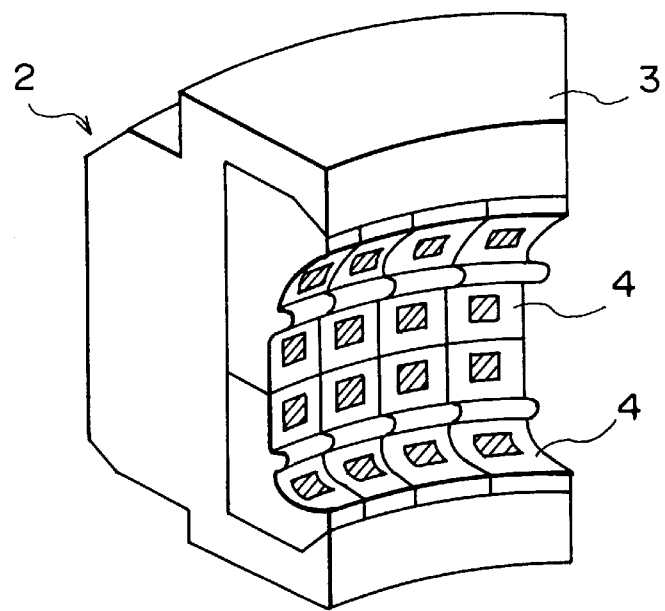
FIG. 2
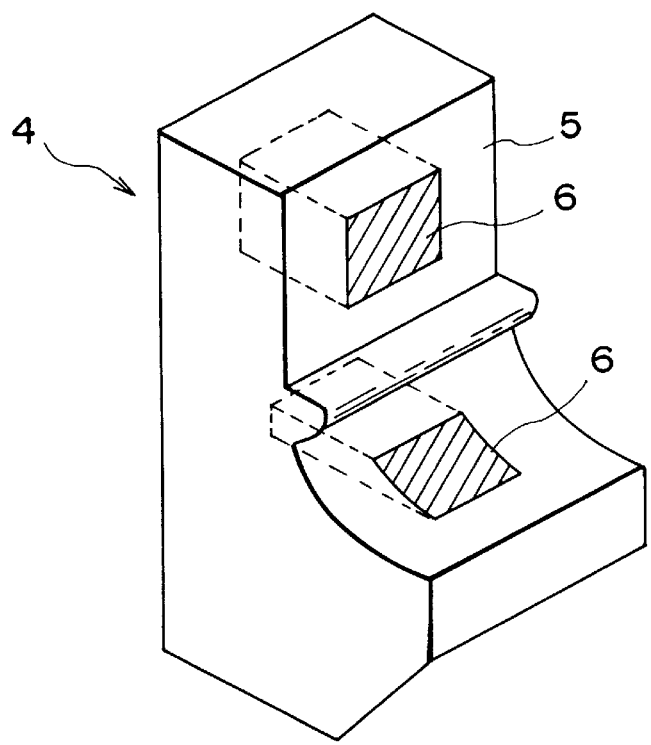

MOLD FOR TIRE VULCANIZATION AND MANUFACTURING METHOD THEREOF

BACKGROUND OF THE INVENTION

1. Field of the Invention

The present invention relates to a mold for tire vulcanization and to a manufacturing method thereof, particularly to a mold for tire vulcanization by which a tire having excellent appearance can be obtained and production of defective tires during vulcanization can be decreased.

2. Description of the Prior Art

As a conventional mold for tire vulcanization, as shown in FIG. 4 of the accompanying drawings, a so-called insert segment type mold is well known, where a plurality of pieces 8 having an uneven interior corresponding to the land portions and the groove portions of at least the tread portion of a tire product are arranged adjacent each other and are disposed on a block 3 as a supporting means to comprise one segment 2. Furthermore the segments 2 are arranged adjacent each other, in other words are joined as a ring to form a predetermined interior configuration, as shown in FIG. 3.

In the case of the conventional mold of insert segment type where, as shown in FIG. 4, a plurality of pieces 8 are disposed on a block 3 as a supporting means to comprise one segment 2 and the segments are joined as a ring, it is necessary that an unvulcanized tire is pressed to the interior of the mold and is fitted thereto by inflation of a bladder. Therefore, air between the outer surface of the unvulcanized tire and the interior of the mold is exhausted through boundary portions 7 between adjacent pieces 8.

For such exhausting of the air between the tire and the mold, the boundary portion 7 between pieces 8 adjacent each other should be determined at the position where air remains during tire vulcanization and therefore a light spot bare tends to be generated. The term "light spot bare" refers to an incompletely molded portion on a vulcanized tire surface caused by air or water between the unvulcanized tire and the mold. However, setting the boundary portions at all positions where light spot bare tends to be generated causes an increase of the cost of the mold because of the increase of the number of the pieces or difficulty of manufacturing a piece.

The object of the present invention is to provide an insert segment type mold for tire vulcanization by which a tire having excellent appearance can be obtained and production of defective tires during vulcanization can be decreased, and to provide a manufacturing method thereof, without increase of the number of the mold pieces and increase of the cost because of complication of the boundary line configuration between the pieces.

SUMMARY OF THE INVENTION

The present invention in one aspect provides a mold for tire vulcanization, comprising a plurality of segments forming respectively a part of a circular interior complementary to land portions and groove portions of the tread portion of a tire product and being separable from each other in the tire circumferential direction, and each of the segments comprising a plurality of pieces forming the said circular interior part and a block supporting the pieces, characterized in that each of the pieces comprises a combination of a matrix metal and a core made of a different kind of material, which is fitted to the matrix metal, and having a lower coefficient of thermal expansion than that of the matrix metal.

In a preferred embodiment of the mold according to the invention the matrix metal has a through hole and the core is fitted to the through hole.

Preferably the dimension of the core has a function of the temperature of tire vulcanization and the coefficients of thermal expansion of the matrix metal and the core, for producing a desirable gap between the matrix metal and the core during tire vulcanization.

The gap produced between the matrix metal and the core during tire vulcanization is suitably 0.01 to 0.03 mm.

The invention in another aspect provides a manufacturing method of the mold for tire vulcanization according to the first aspect of the invention, characterized in that, upon casting the matrix metal, the matrix metal is cast around the core with a higher fusion point than that of the matrix metal.

In the manufacturing method of a mold for tire vulcanization according to the present invention, upon casting the matrix metal of each piece, the matrix metal is cast around the core of different material which has higher fusion point and lower coefficient of thermal expansion than those of the matrix metal, and therefore the matrix metal is not deposited on the core upon casting.

Also, in the mold for tire vulcanization according to the present invention, at normal temperature there is no gap between the matrix metal and the core of different material, although a gap is generated with rising temperature of the mold upon tire vulcanization because of difference of their coefficients of thermal expansion. The above gap causes the exhaust of air between the mold and the unvulcanized tire, at the boundary portions of the pieces. Furthermore, the core around which the matrix metal is cast in the piece is set at an optional position, and therefore it can be deliberately set at the position where the air between the mold and the unvulcanized tire tends to remain, and the air can be effectively exhausted through the gap and the boundary portion of the pieces. As a result, there is no light spot bare at the land portion, and therefore a tire having excellent appearance can be obtained and production of a defective product upon tire vulcanization can be decreased.

BRIEF DESCRIPTION OF THE DRAWINGS

FIG. 1 is a perspective view of one embodiment of a segment of a mold for tire vulcanization according to the present invention;

FIG. 2 is an enlarged schematic perspective view of a piece of a segment of a mold according to the present invention;

DESCRIPTION OF THE PREFERRED EMBODIMENTS

In the following, the present invention will be explained in detail with reference to the drawings.

Figure 3:
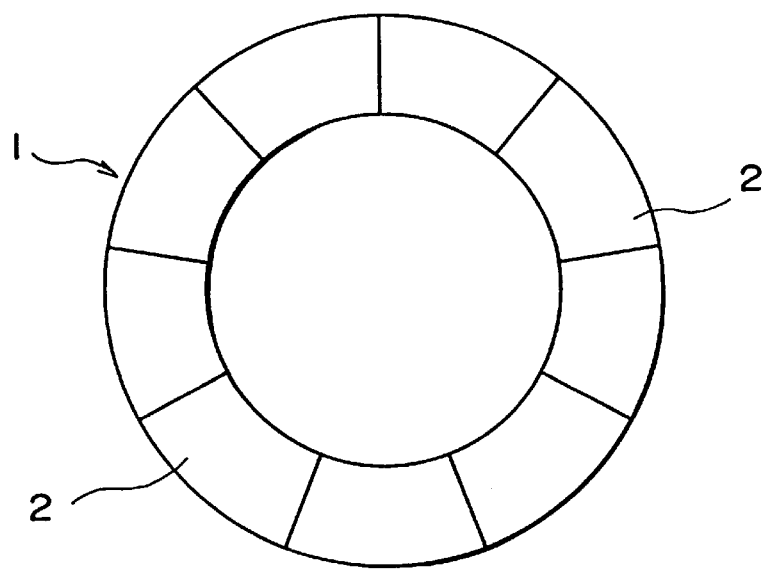
FIG. 3 is a plan view of a mold for tire vulcanization which comprises a plurality of segments.
Figure 4:
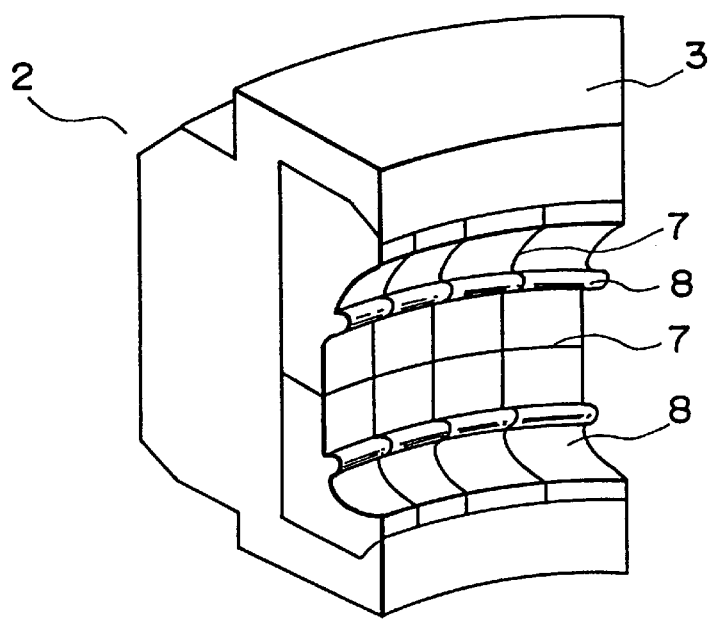
FIG. 4 is a perspective view of a segment of a conventional mold for tire vulcanization.

FIG. 3 is a plan view showing a model of a preferred embodiment of a mold 1 for tire vulcanization according to the present invention. The mold 1 comprises a plurality of segments 2. The above segments 2 are joined to each other as a ring, as shown in FIG. 3, upon the vulcanization of an unvulcanized tire, and then the circular interior, which has a complementary configuration to the land portions and the groove portions of the tread of the tire product, is formed.

As shown in FIG. 1, the segment 2 of the present embodiment comprises a block 3 and a plurality of pieces 4 disposed on the block 3. The block 3 has a configuration corresponding to the fixed portion of the piece 4, and each piece 4 is fitted to the block 3 as shown in the figure, and therefore a plurality of pieces 4 are fitted as a whole to the block 3 to comprise a segment 2. The segments 2 comprise a part of a circular interior complementary to the land portions and the groove portions of the tread portion of a tire product.

Ten to twenty pieces 4 are provided on each block 3, as conventional.

In the present invention, each piece 4 comprises a combination of a matrix metal 5 and a core 6 made of a different kind of material which is fitted to a through hole of the matrix metal 5 and has a lower coefficient of thermal expansion that that of the matrix metal 5, as shown in FIG. 2. The matrix metal can be suitably aluminium, and in that case the core of a different kind of material is preferably iron or iron alloy. However, the present invention is not limited to such a combination.

In the manufacturing method according to the present invention where upon casting the matrix metal 5, as the core 6 of a different kind of material there is used a material with a higher fusion point than that of the matrix material 5, and the matrix metal 5 is cast around the core 6 to manufacture a piece 4, it is particularly preferable to use a combination of aluminium as the matrix metal and iron or iron alloy as the core of a different kind of material. In the above manufacturing method, the core 6 is set and the matrix metal is cast around the core at the position where light spot bare has to be generated. In other words, although the boundary portion between the adjacent pieces 4 should be primarily set at the position where light spot bare has to be generated upon tire vulcanization, it is difficult to set the boundary portion at all of the above positions. Therefore, it is preferable that the core 6 is set at the above position and the matrix metal is cast around it.

As one embodiment according to the invention, a piece 4 as shown in FIG. 2 was manufactured by a method wherein aluminium as a matrix metal 5 is cast around SS400, a kind of iron or iron alloy metal as a core 6 of a different kind of metal material. In this embodiment, the coefficient of linear thermal expansion of aluminium as the matrix metal 5 is about $2.2 \times 10^{-5}$, and the coefficient of linear thermal expansion of SS400 as the core 6 is about $1.1 \times 10^{-5}$. Therefore, at normal temperature there is no gap between the matrix metal 5 and the core 6, and with increasing temperature of the mold upon tire vulcanization a gap is obtained by the amount which corresponds to the value of $1.1 \times 10^{-5}$, which is the difference between their respective coefficients of linear thermal expansion, the difference between the temperature of tire vulcanization and normal temperature, and a half length of a side of the core 6 multiplied together.

For example, when normal temperature is 20° C., the tire vulcanization temperature is 160° C. and a length of a side of the core is 20 mm, a gap is obtained at the tire vulcanization of about 0.015 mm, which is calculated by the following expression: $1.1 \times 10^{-5} \times (160-20) \times 20/2$. The above gap causes exhaust of air without generating burr rubber on the tire surface upon tire vulcanization.

The size of the gap which is obtained upon tire vulcanization can be easily changed by change of the difference of the coefficient of linear thermal expansion by changing the material of the matrix 5 and/or the core 6, changing the configuration the core 6 and so on.

As explained in the above, by means of the mold for tire vulcanization and manufacturing method thereof according to the present invention there can be obtained a tire having excellent appearance without generating a light spot bare on the land portion of the tire. The mold and method of the invention can also easily be adapted to a change of tire design, and further can decrease the production of defective tires upon tire vulcanization.

While the invention has been particularly shown and described with reference to certain preferred embodiments thereof, it will be understood by those skilled in the art that various changes and modifications may be made within the spirit and scope of the invention.

I claim:

1. A mold for tire vulcanization, comprising; a plurality of segments forming respectively a part of a circular interior complementary to land portions and groove portions of the tread portion of a tire product and being separable from each other in the tire circumferential direction, and each of said segments comprising a plurality of pieces forming said circular interior part and a block supporting said pieces, wherein each of said pieces comprises a combination of a matrix metal and a core; said core made of a different material than that of said matrix metal, said core fitted to said matrix metal and having a lower coefficient of thermal expansion than that of said matrix metal, wherein at ambient temperature there is no gap between said matrix metal and said core and upon an increase in mold temperature during vulcanization a gap is generated.

2. The mold according to claim 1, wherein the matrix metal has a through hole and the core is fitted to the through hole.

3. The mold according to claim 1, wherein, during tire vulcanization, said gap is produced between the matrix metal and the core which is a function of at least one of; the difference between the respective coefficients of thermal expansion of the matrix metal and core, the difference between the temperature of tire vulcanization and ambient temperature, and the size of the core.

4. The mold according to claim 1, wherein the gap produced between the matrix metal and the core during tire vulcanization is 0.01 to 0.03 mm.

5. The mold according to claim 1, wherein said matrix material is aluminum and said core is an iron based metal.

6. The mold of claim 1, wherein a coefficient of linear thermal expansion of said matrix metal is in the order of $2.2 \times 10^{-5}$ and a coefficient of linear thermal expansion of said core is in the order of $1.1 \times 10^{-5}$.

* * * * *